United States Patent [19]
Datsko et al.

[11] Patent Number: 5,091,870
[45] Date of Patent: Feb. 25, 1992

[54] APPARATUS FOR MEASURING THE SPEED OF TRANSMISSION OF DIGITAL CHARACTERS

[75] Inventors: George Datsko, Rochester, N.Y.; William J. Ross, Cambridge, Ohio

[73] Assignee: NCR Corporation, Dayton, Ohio

[21] Appl. No.: 537,219

[22] Filed: Jun. 12, 1990

Related U.S. Application Data

[63] Continuation of Ser. No. 199,966, May 27, 1988, abandoned.

[51] Int. Cl.$^5$ .......................... G04F 10/00; G01P 3/50
[52] U.S. Cl. ....................................... 364/565; 364/569
[58] Field of Search ................. 364/565, 569, 200, 900

[56] References Cited

U.S. PATENT DOCUMENTS

| | | | |
|---|---|---|---|
| 3,973,242 | 8/1976 | Field et al. | 340/168 B |
| 4,312,074 | 1/1982 | Pautler et al. | 375/114 |
| 4,503,533 | 3/1985 | Tobagi et al. | 370/85 |
| 4,517,637 | 5/1985 | Cassell | 364/138 |
| 4,535,404 | 8/1985 | Shenk | 364/200 |
| 4,564,918 | 1/1986 | McNally et al. | 364/569 |
| 4,584,684 | 4/1986 | Nagasawa et al. | 371/33 |
| 4,618,965 | 10/1986 | Maxwell et al. | 375/10 |
| 4,623,984 | 11/1986 | Yokokawa et al. | 364/900 |
| 4,628,511 | 12/1986 | Stitzlein et al. | 364/900 |
| 4,628,511 | 12/1986 | Stitzlein et al. | 371/22 |
| 4,654,807 | 3/1987 | Bremer | 364/551 |
| 4,764,863 | 8/1988 | Silverthorn, III | 364/200 |
| 4,816,989 | 3/1989 | Finn et al. | 364/200 |
| 4,930,093 | 5/1990 | Houser et al. | 364/569 |

FOREIGN PATENT DOCUMENTS

| | | |
|---|---|---|
| 2039693 | 1/1979 | United Kingdom . |
| 2158679 | 1/1985 | United Kingdom . |

OTHER PUBLICATIONS

Article entitled, "A Versatile Approach to the Monitoring of Communications Systems", by D. A. Lindberg, Headquarters Air Force Communications Service, Richards-Gebaur ABF, Mo.

*Primary Examiner*—Eddie P. Chan
*Assistant Examiner*—Matthew C. Fagan
*Attorney, Agent, or Firm*—Richard W. Lavin

[57] ABSTRACT

An apparatus for capturing data outputted by a data processing unit includes an interface unit for generating a strobe pulse for each data word outputted, a timer for measuring the elasped time between the occurrence of two consecutive data words and a DMA controller for storing the data words together with the elapsed time data words in a remote storage unit. A time-out circuit insures that the time measured is between the occurrence of the first and second data words of each pair of data words.

5 Claims, 14 Drawing Sheets

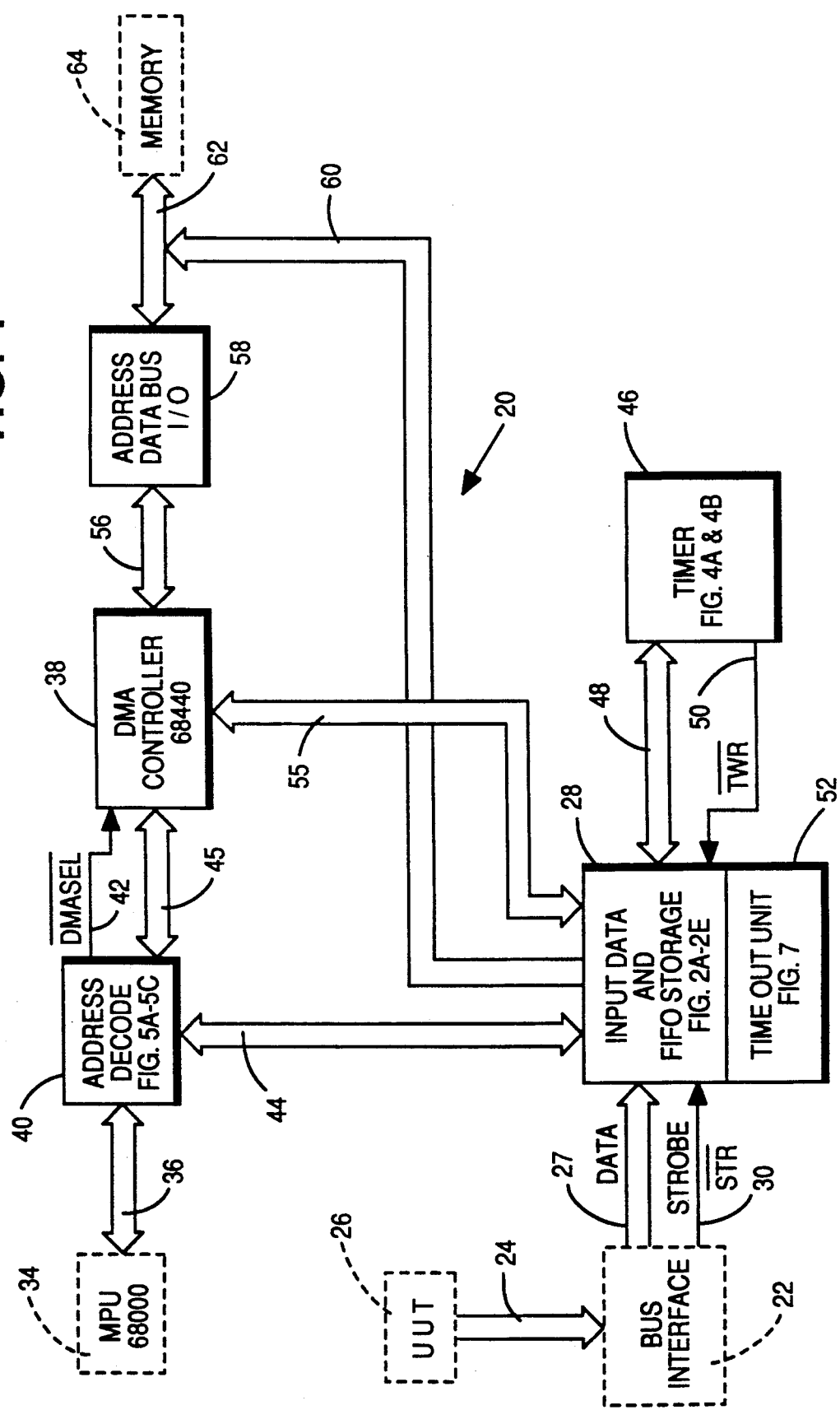

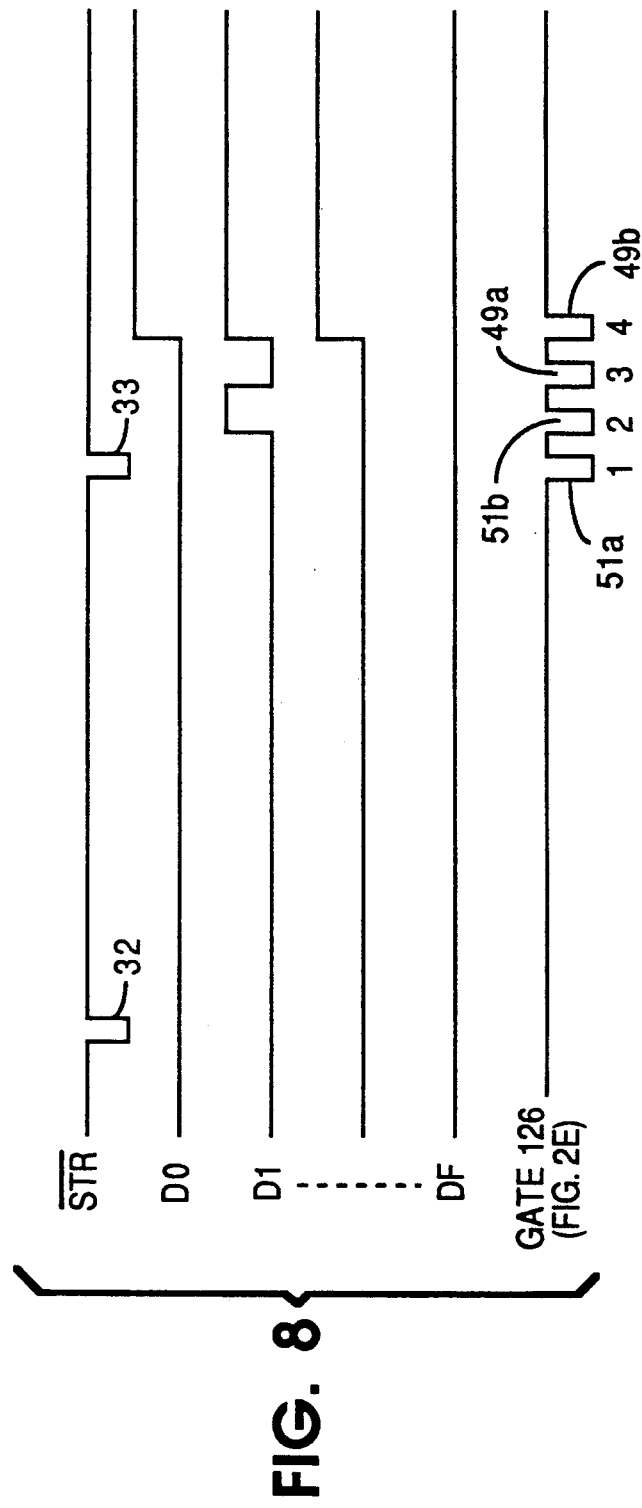

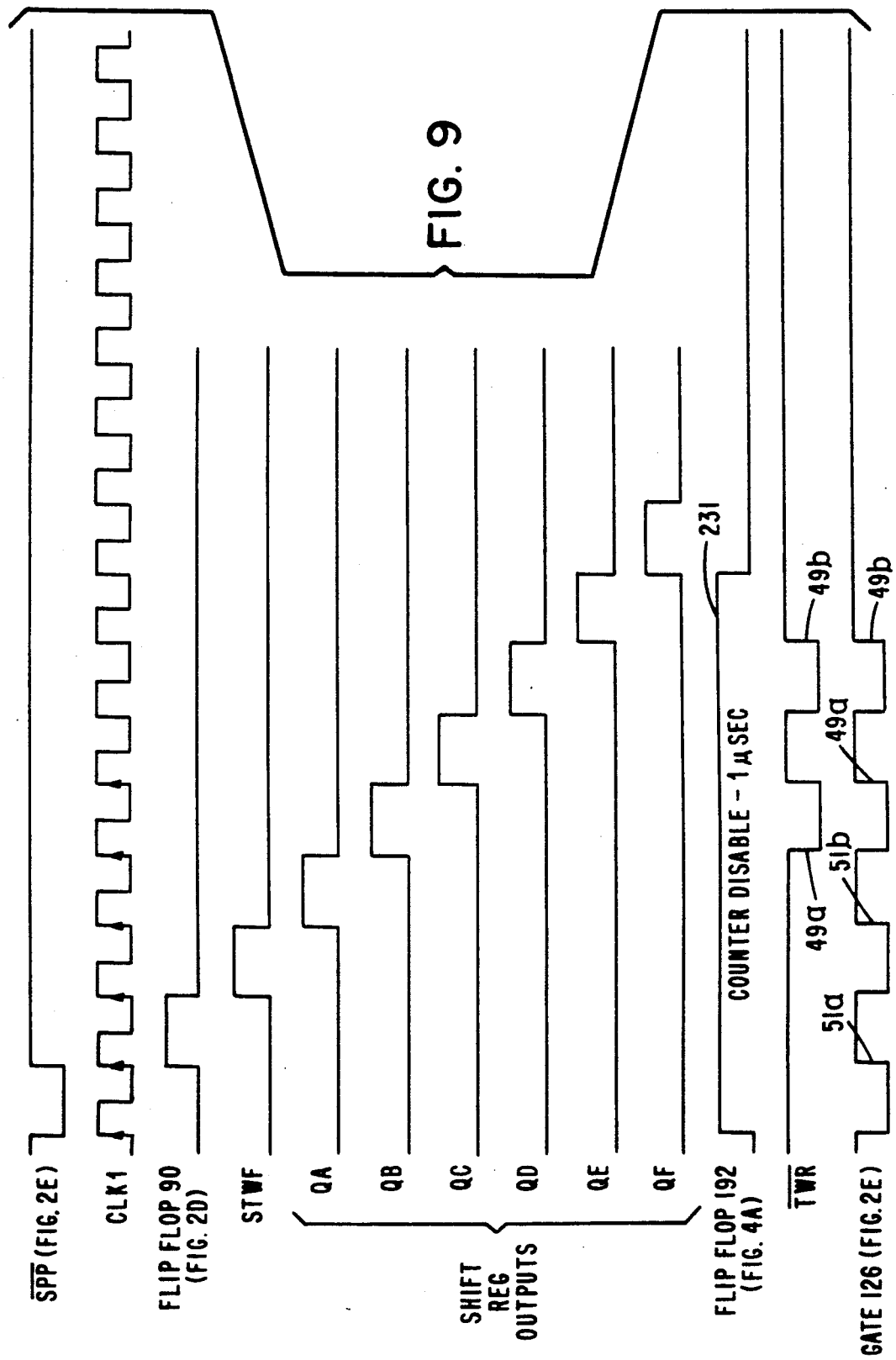

APPARATUS FOR MEASURING THE SPEED OF TRANSMISSION OF DIGITAL CHARACTERS

This is a continuation of co-pending application Ser. No. 199,966 filed on May 27, 1988 now abandoned.

BACKGROUND OF THE INVENTION

The present invention relates to a data capture apparatus in which data outputted over a communication channel from a data terminal device is collected, and more particularly relates to an apparatus for generating data representing the elapsed time between two consecutive data words that are transmitted over the communication channel.

Local area networks have become very important in solving communication requirements where a large number of remote processing devices such as data terminals are connected over a common communication channel to a host processor. As the operating speeds of the remote terminal devices have increased, there has arisen a need to check the speed of transmission of the data over the communication channel. Because of such increases in the speed of transmission of data, prior data capture apparatuses used in checking such data transmission have had trouble in sensing the presence of two consecutive data words transmitted over the communications channel, thus increasing the time required for analyzing the throughput speed of the data processing system.

SUMMARY OF THE INVENTION

In accordance with one embodiment of the invention, there is provided an interface unit coupled between a data terminal device and a remote memory or storage unit for sensing the occurrence of two consecutive data words and a pair of strobe pulses which includes timing means for generating time stamp data representing the time that has elapsed between the appearance of two consecutive words of a data stream. The interface unit further includes latching means for latching consecutive sixteen-bit data words and storage means for temporarily storing the latched data words in response to the detection of the strobe pulses by the storage means. The time stamp data is also stored in the storage means in response to control signals generated by the timing means. A direct memory access (DMA) controller controls the transfer of data stored in the storage means for transmission to the remote storage device in accordance with address data outputted by a processor. Means are also included for generating a time-out signal which enables the DMA controller to synchronize the transfer of data from the storage unit to the remote storage unit.

It is therefore a principal object of this invention to provide an interface unit for use in an apparatus for capturing data outputted by a data terminal device.

It is a further object of this invention to provide an interface unit for generating time data representing the time that has elapsed between the appearance of two consecutive data words outputted by a data terminal device.

The various objects, features and advantages of the invention, as well as the invention itself, will become more apparent to those skilled in the art in the light of the following detailed description taken together with the accompanying drawings wherein like reference numerals indicate like or corresponding parts throughout the several views.

BRIEF DESCRIPTION OF THE DRAWINGS

FIG. 1 is a block diagram of the interface unit of the present invention showing the connections between the terminal device under test and the remote storage device;

FIG. 8 is a timing diagram of control pulses generated during operation of the interface unit;

FIG. 9 is a timing diagram of the operation of the timer unit of FIG. 1.

DESCRIPTION OF THE PREFERRED EMBODIMENT

Figure 2A:
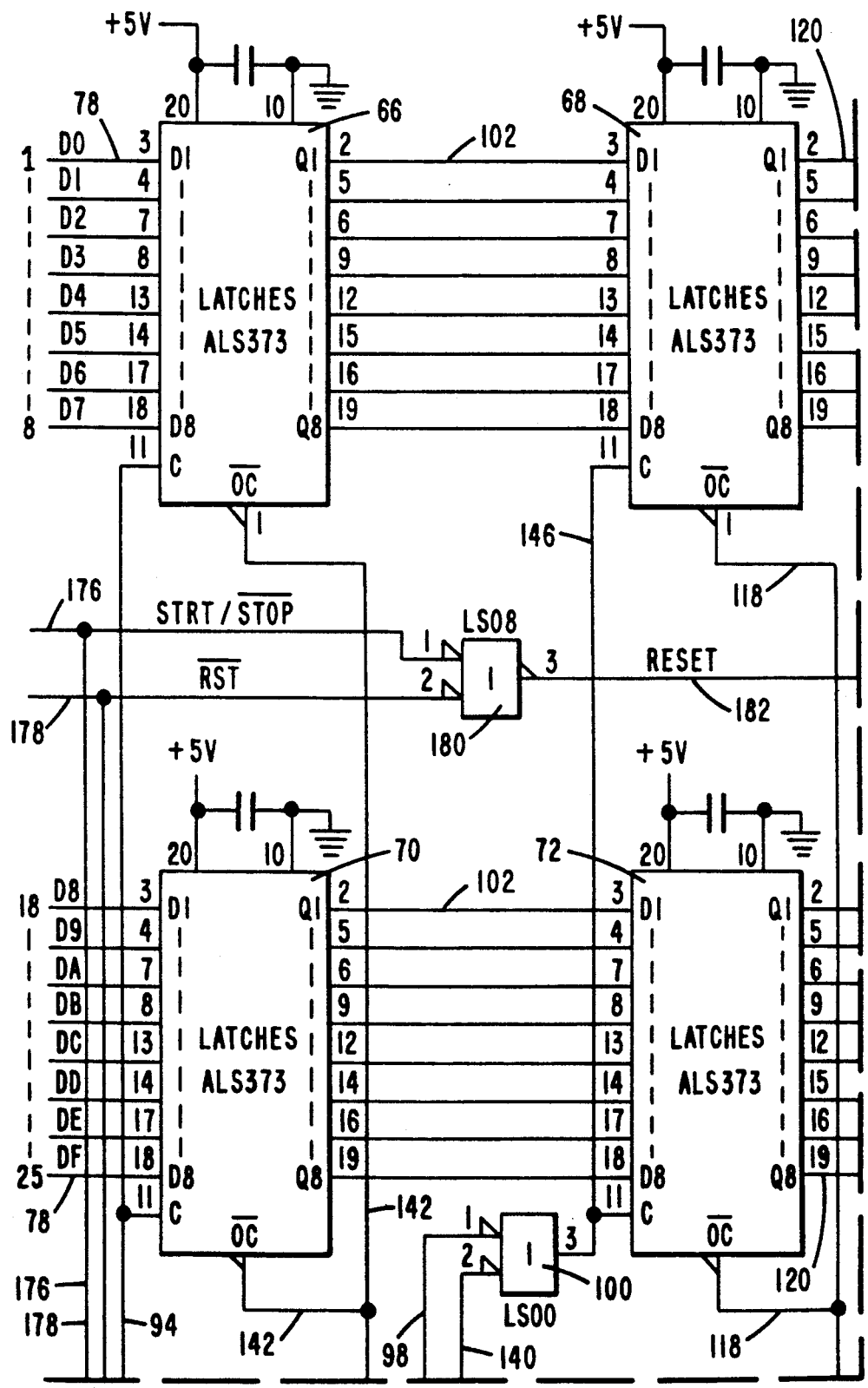
FIGS. 2A, 2B, 2C, 2D, and 2E inclusive, arranged as shown in FIG. 3, disclose the input data and FIFO storage unit of FIG. 1.

It should be noted at this time that throughout this description of the preferred embodiment, the presence of a slash following either a symbol or acronym represents the logical inversion of that symbol or acronym. Unless otherwise noted, all designated integrated circuit elements are commercially available from the Texas Instrument Corporation of Dallas, Tex.

Referring now to FIG. 1, there is shown a block diagram of the interface unit and its connections to the terminal device under test and the remote storage unit in which is stored the test data. The interface unit generally indicated by the numeral 20 includes a bus interface unit 22 coupled over a sixteen-bit multi-data bit bus 24 to the terminal device under test (UTT) 26 over which sixteen bit data words are transmitted. The interface unit 22 will output over bus 27 sixteen bit data words received over the multi-bus 24 to an input data and FIFO storage unit 28 for storage therein. The bus interface unit 22 will also output over line 30 pairs of strobe pulses 32 and 33 (FIG. 8) which are used by the storage unit 28 in capturing two consecutive data words for storage in the FIFO storage unit 28 in a manner that will be described more fully hereinafter. The interface unit 20 also includes a Motorola MC 68000 microprocessor unit (MPU) 34 which outputs over bus 36 twenty-three address data bits which are used in reading data stored in or writing data to storage registers located in a Motorola MC 68440 DMA controller unit 38 and in the storage unit 28. The units 34 and 38 are commercially available from the Motorola Corp. of Phoenix, Ariz. The address data bits are transmitted over bus 36 to an address decode unit 40 which, upon detecting a predetermined address, will output a DMA select signal DMASEL/ over line 42 enabling the DMA controller unit 38 to control the storing of the data words outputted over bus 60 from the FIFO storage unit 28. The DMA controller unit 38 outputs address data bits over bus 56 to an address data bus I/O unit 58 which transmits the address data bits over bus 62 to a remote disc file memory unit 64 for controlling the location in the memory unit where the data words transferred from storage unit 28 under the control of the controller unit are to be stored.

Associated with the storage unit 28 is a timer unit 46 which will output over bus 48 time stamp data representing the elapsed time between consecutive data words, which time stamp data is stored in the storage unit 28 together with its associated data words. The timer 46 will also output a pair of write pulses 49a and 49b (FIGS. 8 and 9) over bus 48 to the storage unit 28 for use in storing the time stamp data in the storage unit 28. Located in the storage unit 28 is a time-out unit 52 which is used to generate time-out pulses for synchronizing the operation of the storage unit 28 in capturing the two consecutive data words which are to be time stamped. The DMA controller unit 38 will also generate control signals over bus 56 to the I/O unit 58 for controlling the transmission of the data words outputted by the storage unit 28 over the busses 60 and 62 to the memory unit 64.

Figure 2B:
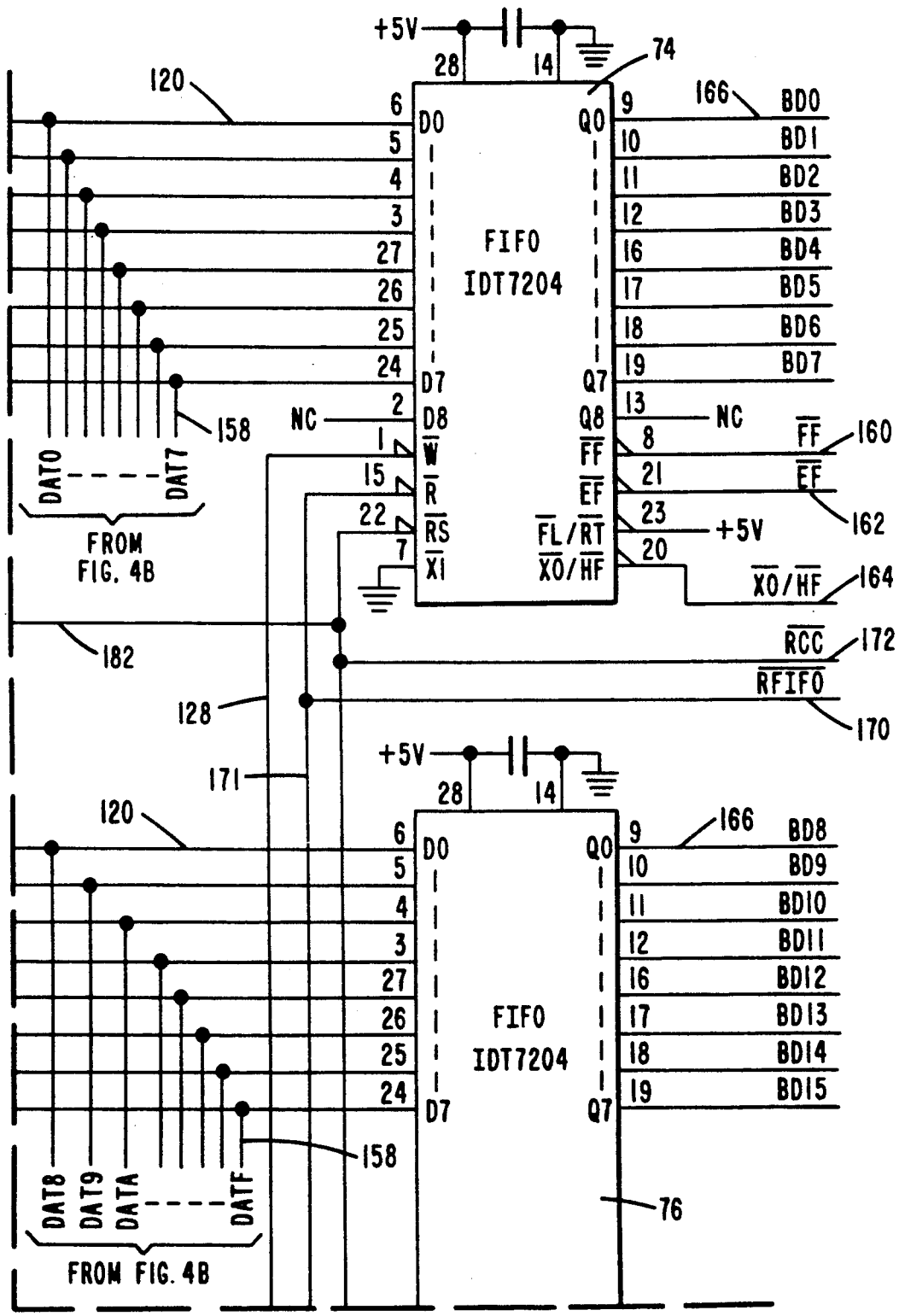
Figure 2C:
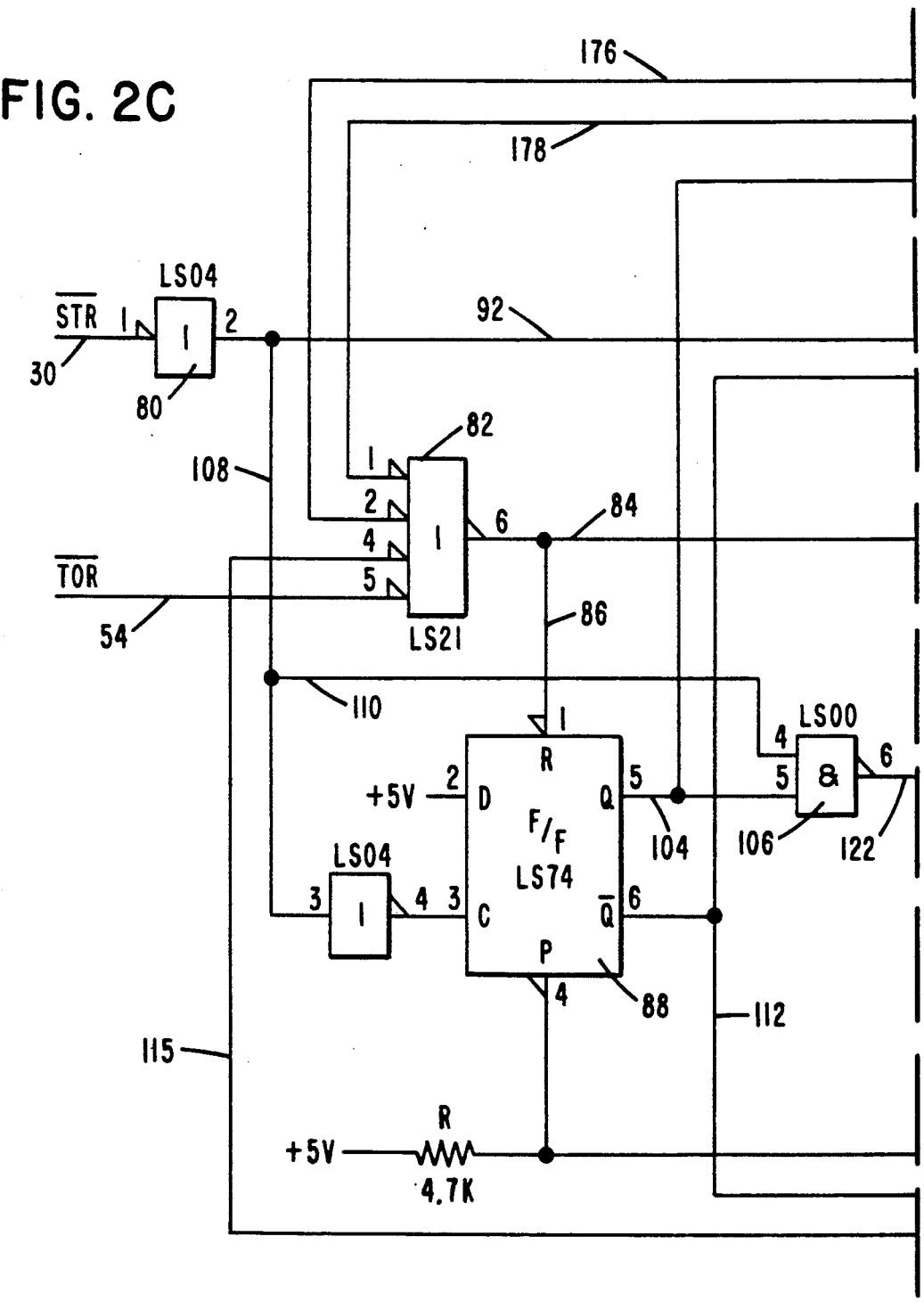
Figure 2D:
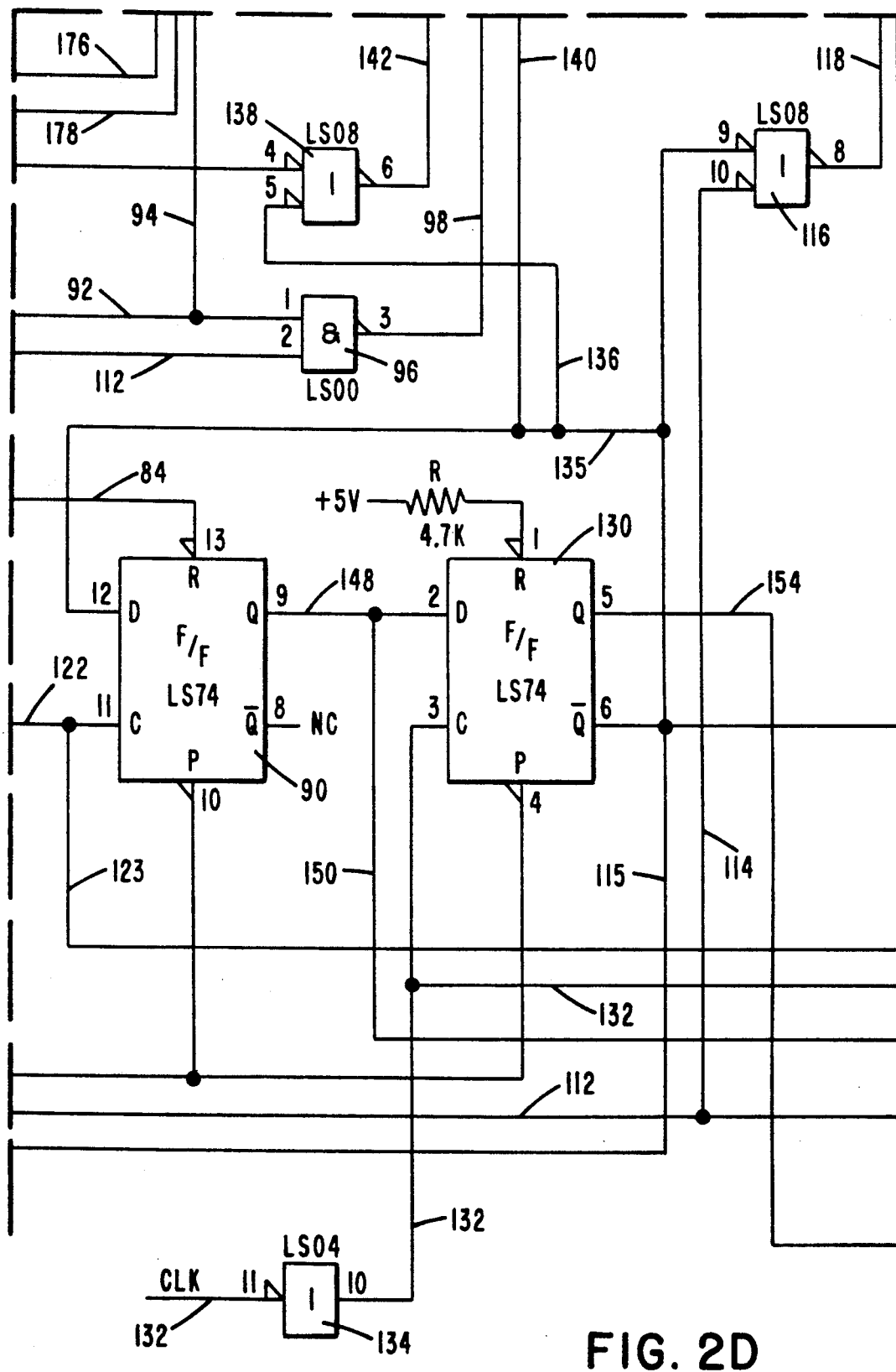

Referring now to FIGS. 2A-2E inclusive, there is disclosed a block diagram of the input data and FIFO storage unit 28 (FIG. 1) which captures and stores the test data words outputted over bus 27 from the bus interface unit 22 (FIG. 1). Included in the unit are four ALS 373 latches 66-72 inclusive (FIG. 2A) and two IDT 7204 FIFO storage members 74 and 76 (FIG. 2B). The latch members 66 and 70 receive sixteen bit data words from the bus interface unit 22 on the input lines 78 which are part of the bus 27 (FIG. 1). Each sixteen bit data word appearing on the input lines 78 is accompanied by a negative going strobe pulse STR/ 32 or 33 (FIG. 8) which is inputted over line 30 (FIG. 2C) to an inverter 80. Two sixteen bit words accompanied by the strobe pulses STR/ 32 and 33 (FIG. 8) are presented consecutively over lines 78 (FIG. 2A) thereby identifying a 32-bit word outputted from the terminal device under test 26 (FIG. 1). As will be explained more fully hereinafter, the time interval between the two consecutive words is measured by a counter in the timer unit 46 (FIG. 1). If the second strobe pulse is detected first, a time-out will occur under the control of the time-out unit 52 and a time-out signal TOR/ appearing on input line 54 (FIG. 2C) will be inputted into one input of an LS21 NOR gate 82 (FIG. 2C). The NOR gate 82 is coupled over lines 84 and 86 to the reset input of a pair of LS74 flip-flops 88 (FIG. 2C) and 90 (2D) resetting the flip-flops for another detection operation. The occurrence of the time-out signal TOR/ will extend the reset pulse generated by the NOR gate 82 to keep the flip-flops in a reset condition insuring that the data captured will always start with the first word of data.

The inverter 80 is coupled over lines 92 and 94 (FIG. 2D) to the clock input of the latch members 66 and 70 (FIG. 2A). When the first active low strobe pulse STR/ 32 appears on the input line 30 (FIG. 2C), the inverter 80 will output a high signal clocking the latch members latching the first sixteen bit data word appearing on the input lines 78. The high output signal of the inverter 80 is also transmitted over line 92 to one input of an ALS00 NAND gate 96 (FIG. 2D) whose output signal is transmitted over line 98 to one input of an ALS00 NAND gate 100 (FIG. 2A). The high output signal of the gate 100 will clock the latch members 68 and 72. The clocking of the latch members 66-72 inclusive by the first strobe pulse STR/ will enable the first data word appearing on the data input lines 78 to be stored in the latches 66 and 70. Since the OC/ input of the latch members 66-72 inclusive will be grounded when the first strobe pulse appears, the first data word stored in the latches 66 and 70 will automatically be transmitted over lines 102 for storage in the latches 68 and 72. When the strobe pulse STR/ 32 goes to ground, the clock signals appearing at the clock input of the latch members 66-72 inclusive will enable the latches to store the same data in both sets of latches.

Figure 2E:
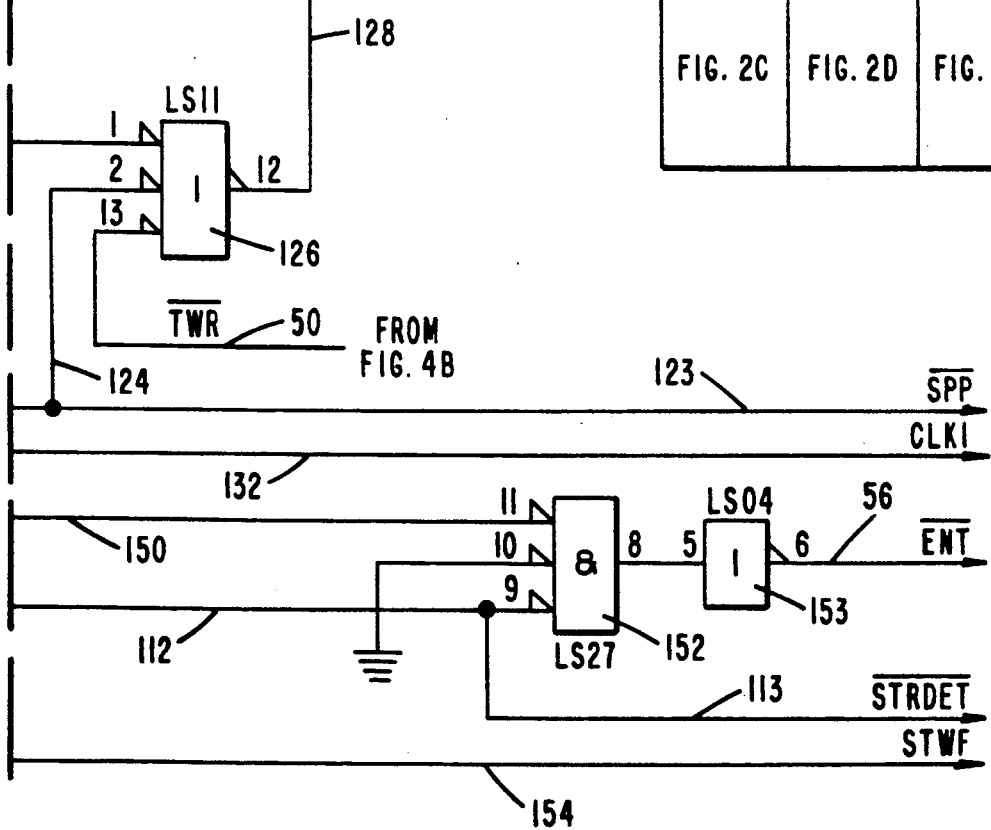

When the first strobe pulse STR/ 32 (FIG. 8) goes low, the signal appearing on the clock input of the flip-flop 88 (FIG. 2C) will clock the flip-flop to signify that the first word of data has been captured in the latch members. The clocking of the flip-flop 88 will output a high signal over its Q output line 104 to one input of an ALS00 NAND gate 106. When the second strobe pulse STR/ 33 (FIG. 8) appears on line 130, it will be transmitted over lines 108 and 110 to the other input of the NAND gate 106. At this time the low Q output signal of the flip-flop 88 is transmitted over line 112 (FIGS. 2C and 2D) and over line 114 to one input of the NOR gate 116 (FIG. 2D) whose low output signal is transmitted over line 118 to the OC/ input of the latch members 68 and 70 (FIG. 2A). The grounding of these inputs will enable the first data word stored in the latch members 68 and 72 to be outputted over lines 120 to the FIFO storage units 74 and 76 (FIG. 2B). The output signal of the NAND gate 106 (FIG. 2C) is also transmitted over lines 122, 123 (FIG. 2D) and 124 (FIG. 2E) to one input of the NOR gate 126 whose write output pulse "W/" 51a (FIGS. 8 and 9) is transmitted over line 128 to the write input of the FIFO storage units 74 and 76 (FIGS. 2B and 2E). As shown in FIG. 8, upon the occurrence of the second strobe pulse 33, the storage unit 28 will generate two write pulses W/ 51a and 51b with the third and fourth write pulses 49a and 49b comprising the timer write pulses TWR/ (FIG. 9). This condition will allow the first word of data to be stored in the storage units 74 and 76 when the signal appearing on the input line 128 goes high.

The flip-flop 130 (FIG. 2D) is clocked by the system clock CLK appearing on the input line 132 (FIG. 2D) and transmitted through the inverter 134 immediately after the flip-flop 90 (FIG. 2D) has been clocked by the second strobe pulse STR/ appearing on line 122 and transmitted through the NAND gate 106 (FIG. 2C). The Q/ output signal of the flip-flop 130 (FIG. 2D) is transmitted over lines 115, 135 and 136 to one input of the NOR gate 138 (FIG. 2D) and over line 140 to one input of the NOR gate 100 (FIG. 2A). The low output signal of the NOR gate 138 appearing on line 142 will be transmitted to the OC/ input of the latches 66 and 70 (FIG. 2A) enabling the latches to output the binary bits of the second data word over lines 102 to the latches 68 and 72 (FIG. 2A). The high output signal of the NOR gate 100 (FIG. 2A) will clock the latches 68 and 72 over line 146 enabling the second data word to be outputted by the latches over lines 120 to the FIFO storage units 74 and 76 (FIG. 2B).

As will be explained more fully hereinafter, the timer unit 46 (FIG. 1) will output over line 50 (FIG. 2E) the pair of write pulses 49a and 49b (FIGS. 8 and 9) which will be inputted into the NOR gate 126 (FIG. 2E). The occurrence of the third write pulse TWR/ 49a (FIG. 9) enables the gate 126 to output a high signal over line 128 which writes the first word of time stamp data appearing on the input lines 120 and 158 (FIG. 2B) into the storage units 74 and 76. The fourth write pulse 49b writes the second word of time stamp data into the storage units 74 and 76.

The appearance of the second strobe pulse STR 33 (FIG. 8) appearing on line 30 (FIG. 2C) is also transmitted through the inverter 80, over lines 108 and 110, through the NAND gate 106 and over lines 123 and 124 to the NOR gate 126 (FIG. 2E). The gate 126 outputs the second write signal 51b (FIGS. 8 and 9) over line 128 to the storage units 74 and 76 (FIG. 2B) which stores the second data word in the storage units. The output signal of the NAND gate 106 (FIG. 2C) is also transmitted over line 122 to the clock input of the flip-flop 90 (FIG. 2D) resulting in the clocking of the flip-flop. The Q output signal of the flip-flop 90 appearing on lines 148 and 150 is transmitted through the NAND gate 152 and the inverter 153 (FIG. 2E). The low output signal of the inverter 153 is transmitted over line 56 of bus 55 (FIG. 1) as the enabled timer signal ENT/ which is transmitted to the time-out unit 52 (FIG. 1) to control the operation of a counter in the time-out unit to determine whether the second strobe pulse 33 was detected in its proper position with respect to the first strobe pulse 32 or was detected first, as will be explained more fully hereinafter. The signal ENT/ will be transmitted over line 56 (FIG. 2E) upon the occurrence of a STR strobe pulse on line 30 (FIG. 2C).

The clocking of the flip-flop 90 also results in a high signal appearing on the D-input line 148 of the flip-flop 130 which results in a high signal appearing on the Q output line 154 as the start timer write signal STWF. This signal is transmitted over bus 48 (FIG. 1) to the timer unit 46 to enable the timer unit to output timing data representing the elapsed time between the occurrence of the first and second data word inputted into the interface unit 20. The signal STWF (FIG. 9) enables the timer unit 46 to output the third and fourth timer write pulses TWR 49a and 49b (FIGS. 8 and 9). The time stamp data appears on the input lines 158 (FIG. 2B) comprising the data bits DATO-DATF inclusive for storage in the FIFO storage units 74 and 76. The timer write pulses TWR/ appear on input line 50 (FIG. 2E) as negative pulses to the NOR gate 126 which are outputted over line 128 to the write input of the storage units 74 and 76 enabling the third and fourth data words representing time stamp data to be stored in the storage unit 74 and 76. The high signal appearing on the output line 123 of the NAND gate 106 (FIG. 2C) is transmitted to the timer unit 46 over the bus 48 as the stop signal SPP for use by the timer unit in terminating the timing sequence, as will be explained more fully hereinafter.

Referring to FIGS. 2B and 2E, the FIFO storage unit 74 will output over line 160 of bus 55 (FIG. 1) to the DMA controller unit 38 the signal FF/ indicating that the FIFO storage units are full and the signal XO/-HF/ over line 164 to the decode unit 40 when the storage units are half full. The signal XO/-HF/ is also transmitted over bus 44 (FIG. 1) to a status register 238 (FIG. 5C) in the address decode unit 40 which is read by the DMA controller unit 38 for use in transferring data to the memory unit 64 (FIG. 1). In response to reading the signal XO/-HF/, the DMA controller unit 38 will request that the data stored in the FIFO storage units 74 and 76 be transmitted over the output lines 166 (FIG. 2B) to the memory unit 64 over buses 60 and 62 (FIG. 1). When the storage units 74 and 76 are empty, the signal EF/ appearing on the output line 162 and indicating that the storage units are empty is transmitted over bus 44 to the status register in the decode unit 40 which is read by the DMA controller 38 which stops requesting the transfer of data. When the controller unit 38 starts requesting the data to be transmitted to the memory unit 64, the read FIFO storage unit signal RFIFO/ outputted by the DMA controller unit 38 will appear on the input line 170 (FIG. 2B) of bus 55 (FIG. 1) and be transmitted over line 171 to the read input of the storage units 74 and 76 resulting in the data stored in the storage units 74 and 76 being outputted over lines 166 of the bus 60 for transmission to the memory unit 64 (FIG. 1).

The storage unit 28 will output the reset signal RCC/ over line 172 (FIG. 2B) of bus 48 to reset the timer unit 46 after the last write pulse TWR/49b (FIGS. 8 and 9) has occurred. The signal RCC is outputted from the OR gate 180 (FIG. 2A) which also resets the storage units 74 and 76 over line 182. The output signal of the gate 180 is derived from the start/stop signal STRT/STOP/ appearing on input line 176 (FIG. 2A) of bus 44 and transmitted by the address decode unit 40 (FIG. 1) and also by the reset signal RST/ appearing on input line 178 (FIG. 2A) and transmitted by the DMA controller unit 38 over the bus 55 (FIG. 1) whenever the interface operation is required to be stopped. Both of the signals are transmitted through the NOR gate 180 (FIG. 2A) and over line 182 as the signal RCC to the reset input of the storage units 74 and 76.

Figure 4A:
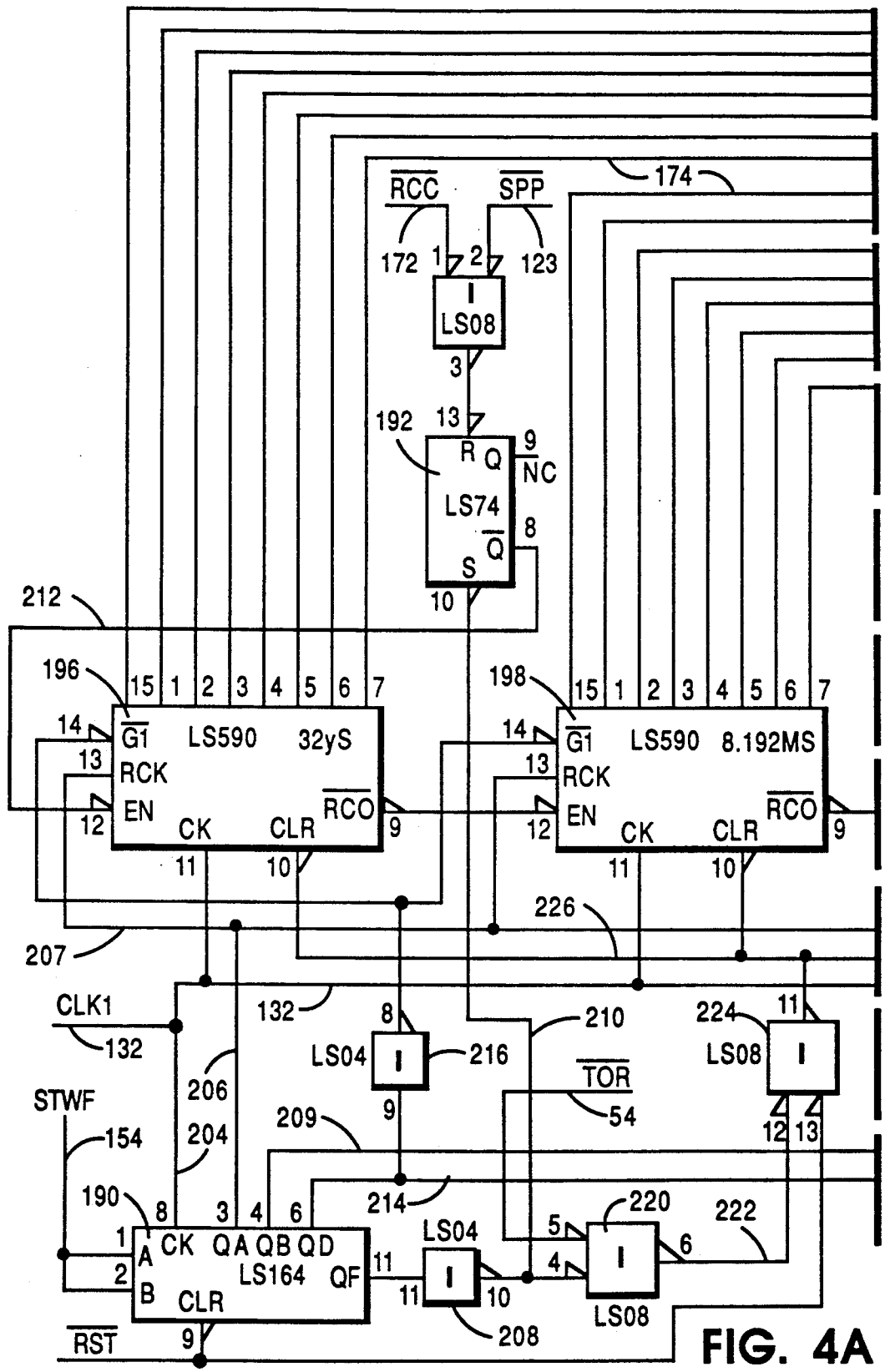
FIGS. 4A and 4B taken together form a block diagram of the timer unit of FIG. 1.
Figure 4B:
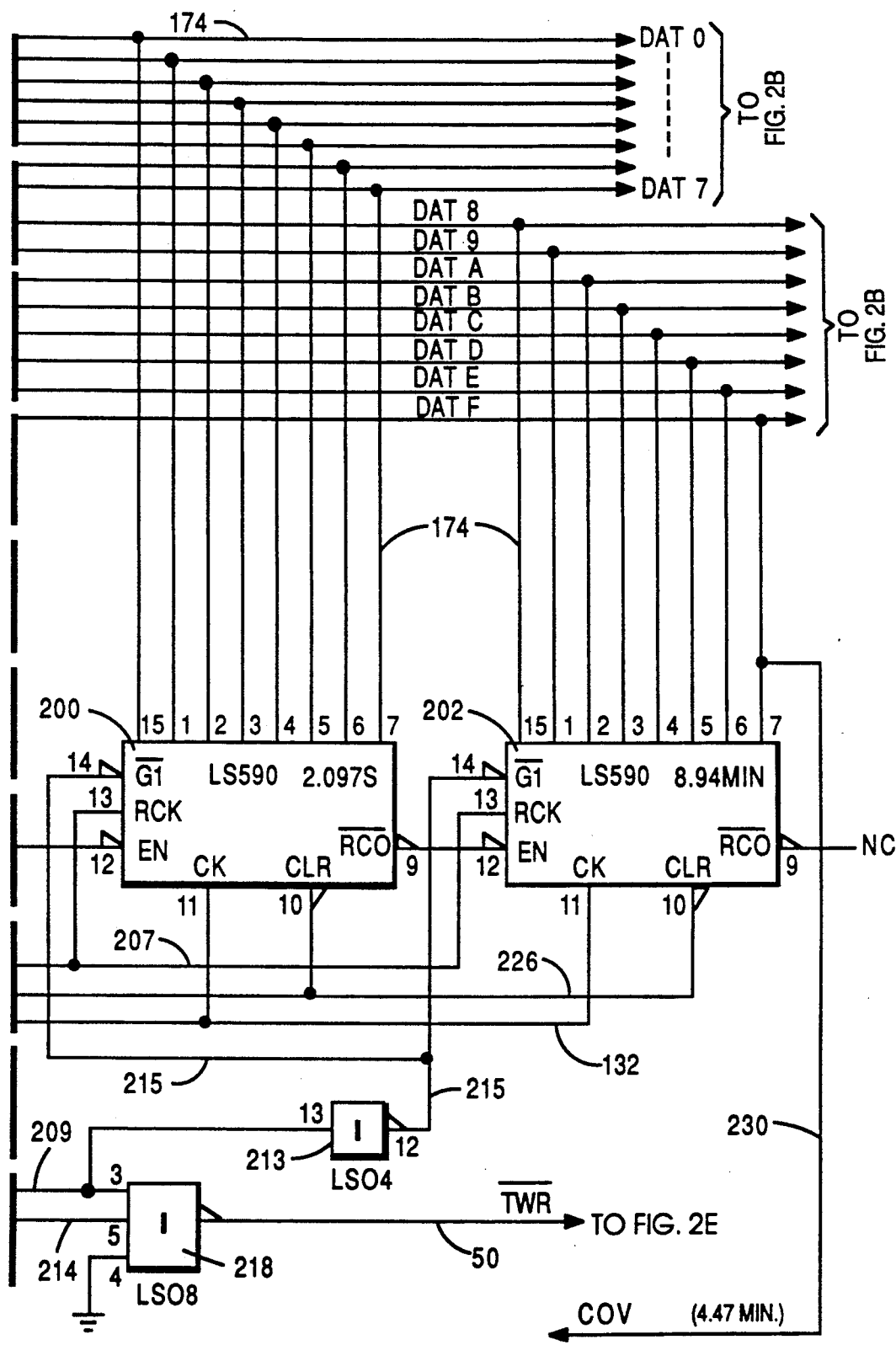

Referring now to FIGS. 4A and 4B, there is disclosed a block diagram of the timer unit 46 (FIG. 1). The timer unit generates the time stamp data representing the elapsed time between consecutive words of data. The unit measures the elapsed time between the occurrence of the second strobe pulse 33 (FIG. 8) of one set of data words to the occurrence of the second strobe pulse 33 of the next set of data words. The timer unit includes an LS164 eight bit shift register 190 (FIG. 4A), an LS74 flip-flop 192 for controlling the operation of the counter and four LS590 eight bit counters 196-202 inclusive which are continuously operating for generating the time stamp data. Each of the counters 196-202 inclusive include both an eight bit counter and an eight bit buffer register. As previously described, the start timer write signal STWF appearing on the input line 154 (FIG. 4A) becomes active high (FIG. 9), enabling the shift register 190 when the second word of data appearing on the input lines 78 (FIG. 2A) of the latches 66 and 70 is written into the FIFO storage units 74 and 76 (FIG. 2B) upon the occurrence of the second strobe pulse 33 (FIG. 8). The shift register 190 is clocked by the system clock signals CLK1 appearing on input lines 132 from the FIFO storage unit (FIG. 2E) and is cleared by the reset signal RST/ appearing on input line 178 and outputted by the DMA controller unit 38 (FIG. 1). As shown in FIG. 9, the shift register 190 will output a series of pulses QA-QF inclusive. The QA pulse appearing on the output line 206 (FIG. 4A) will clock the output count of the counters into the buffer registers in the counters. During the generation of the pulse QB on line 209, the output count representing the second time stamp data and appearing on the output lines 174 of the counters 200 and 202 is transmitted to the FIFO storage unit 28 over bus 48 (FIG. 1). The counters are again enabled by the generation of the signal QF which is transmitted through the inverter 208 and over line 210 to the set input of the flip-flop 192 (FIG. 4A). The setting of the flip-flop 192 outputs an active low signal over the Q/ output line 212 to the enabled input of the counter 196. The output signal QD appearing on output line 214 is transmitted through the inverter 216 to the gate G1/ input of the counters 196 and 198 to enable the output data of the counters to appear on bus lines 174. The signal appearing on line 214 is also transmitted through the NOR gate 218 (FIG. 4B) as the third and fourth write signals TWR/49a and 49b (FIG. 9) which are outputted over line 50 to the FIFO storage unit 28 as previously described for use in storing the time stamp data in the storage units 74 and 76 (FIG. 2B).

During the generation of the first write pulse TWR/49a (FIG. 9), the third data word comprising the first time stamp data word and appearing on the output lines 174 of the counters 200 and 202 (FIG. 4B) is written into the FIFO storage unit 74 and 76 (FIG. 2B). In a similar manner, during the generation of the second write pulse TRW/49b, the fourth word comprising the second time stamp data word appearing on the output lines 174 of the counter 196 and 198 (FIG. 4A) is written into the FIFO storage units. The counters 196-202 inclusive are initially reset by the stop signal SPP/ appearing on line 123 (FIG. 4A) outputted by the storage unit 28 (FIG. 2E) upon the occurrence of the second strobe pulse 33 (FIG. 8) of the next set of data words, thus designating the output count of the counters as the time stamp data. The counters are also reset by the signal RCC/ appearing on the input line 172 and generated by the FIFO storage unit 28 after the last time stamp data word is written into the storage unit. The counters are further reset by the time-out signal TOR/ which is transmitted over line 54 (FIG. 4A) from the time-out unit 52 (FIG. 1) and which is transmitted through the NOR gate 220 (FIG. 4A) as a high pulse over line 222 and through the NOR gate 224 and over lines 226 to the clear input of the counters. After a predetermined time period, for example 4.47 minutes, has elapsed since the start of the counter operation, a counter overflow signal COV (FIG. 4B) will appear on the output line 230 of the counter 202 which is transmitted to the address decode unit 40 for disabling transfer of data to the FIFO storage unit 28. As shown in FIG. 9, the flip-flop 192 (FIG. 4A) will output a one microsecond positive pulse 231 which disables the timer unit from counting during the time the timer unit is writing the time stamp data over lines 174 (FIG. 4B) into the FIFO storage units 74 and 76 (FIG. 2B).

Figure 5A:
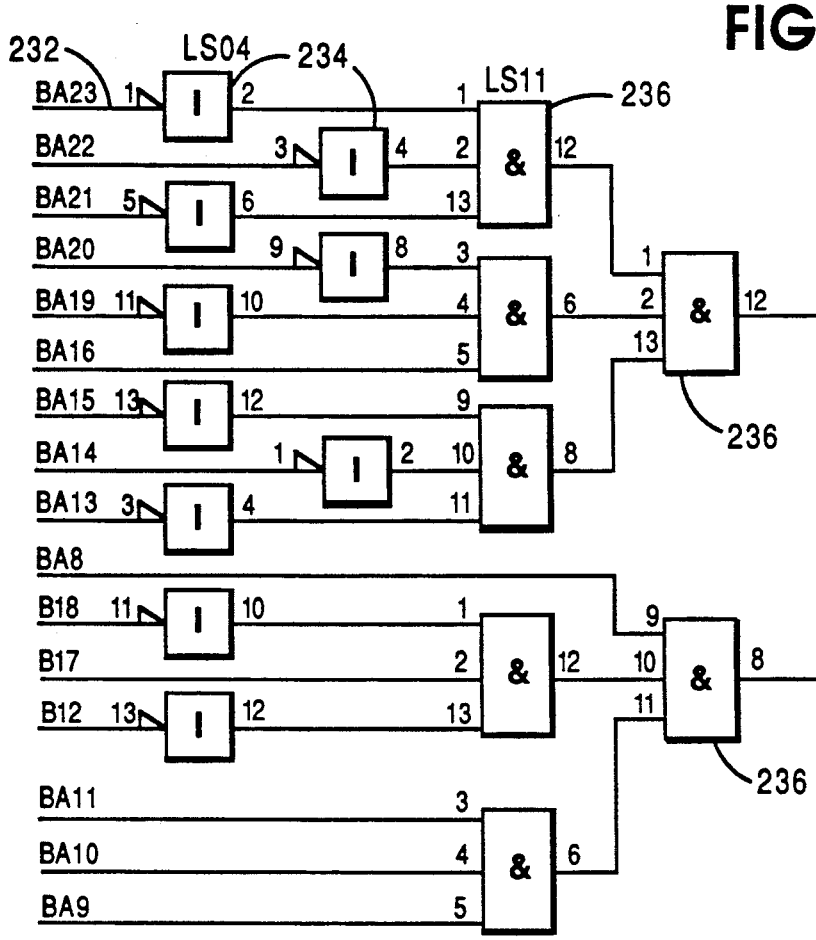
FIGS. 5A, 5B and 5C inclusive, arranged as shown in FIG. 6, disclose a block diagram of the address decoder unit of FIG. 1.
Figure 6:
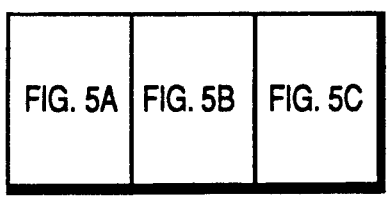
Figure 5B:
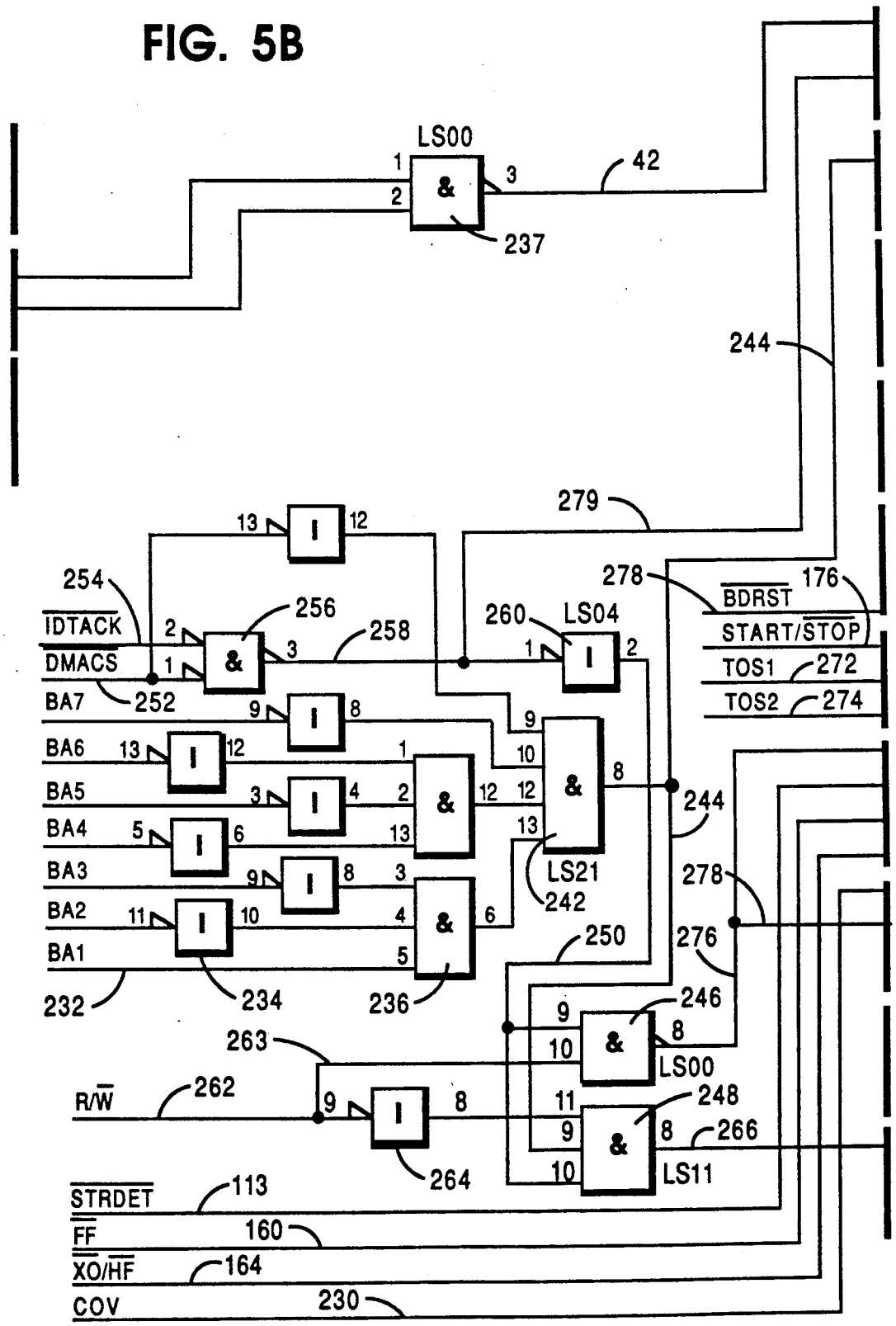
Figure 5C:
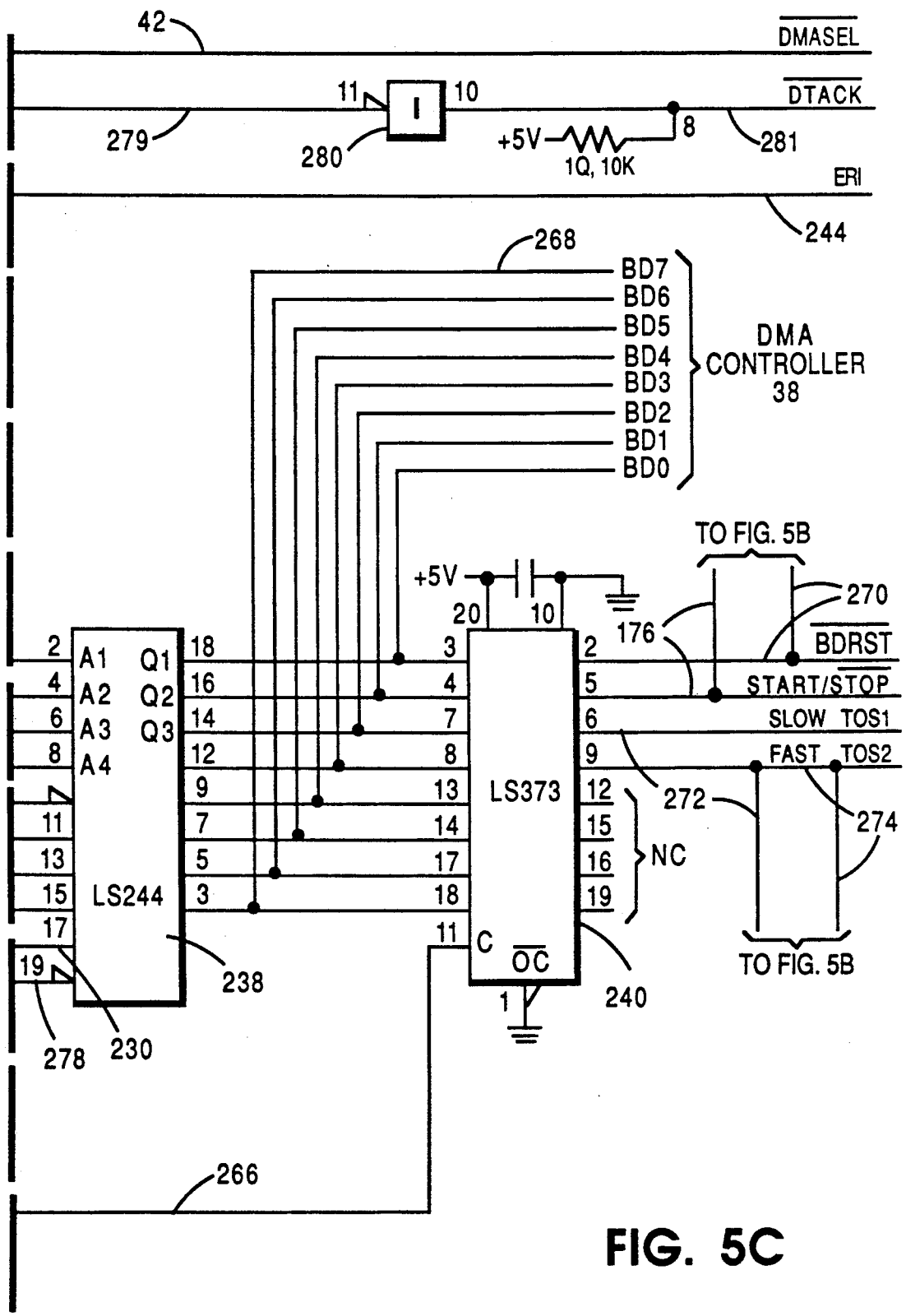

Referring now to FIGS. 5A-5C inclusive there is shown a block diagram of the address decode unit 40 (FIG. 1). The microprocessor unit 34 (FIG. 1) will output a plurality of address data bits over the bus 36 to the address decode unit 40 which address bits are used to control the writing to, or the reading of data stored in, the DMA controller unit 38 or data stored in the address decode unit 40. The microprocessor unit 34 will output the address bits 030DXX which consist of 6 hexadecimal digits. The digits 030D are used to select the DMA controller unit for a processing operation. The last two digits XX are used to specify the internal registers of the DMA controller unit or the address decode unit in which data is to be written into or to be read from. Appearing on the input lines 232 (FIG. 5A and 5B) are twenty-three address data bits BA1-BA23 inclusive which are inputted into a plurality of LS04 inverters 234 and LS11 NAND gates 236 forming a decoding circuit. The upper address bits BA8-BA23 (FIG. 5A) are decoded to detect the presence of the digits 030D while the lower address bits BA1-BA7 inclusive (FIG. 5B) are decoded to determine which register is to be accessed. When the address 030D is detected, the LS00 NAND gate 237 (FIG. 5B) will output the DMA select signal DMASEL/ over line 42 to the DMA controller unit 38 enabling the controller to synchronize the receipt of the incoming data words from the bus interface unit 22.

Included in the address decode unit 40 is the LS244 status register 238 (FIG. 5C) and an LS373 register 240.

The register 238 is accessed only during a read or write cycle by the microprocessor unit 34 (FIG. 1). The address used by the microprocessor unit 34 for activating these registers is the hex address 02. This address will appear as data bits BA1-BA7 on the lower input lines 232 (FIG. 5B). When the address 02 occurs, the LS21 gate 242 (FIG. 5B) will output a high signal over line 244 to one input of the NAND gates 246 and 248. The gates 246 and 248 will also receive high signals on their input line 250 which signals are derived from the clock signals DMACS/ appearing on the input line 252 and the signal IDTACK/ appearing on input line 254, both of which are transmitted from the DMA controller. The signal ITDACK/ is active low when the DMA controller unit 38 acknowledges the receipt of data during a write operation by the microprocessor unit 34 (FIG. 1) or the transmission of data during a read operation of the microprocessor unit. These signals are transmitted through the NAND gate 256 which outputs a low signal over line 258 to the inverter 260 whose high output signal will be inputted into the NAND gates 246 and 248 over line 250. The low output data acknowledge signal DTACK/ of gate 256 is also transmitted over line 279 and through the inverter 280 (FIG. 5C) and over line 281 to the MPU unit 34 (FIG. 1) as an acknowledge signal. If the microprocessor unit 34 is performing a write operation, the active low read/write signal R/W/ appearing on input line 262 (FIG. 5B) will be inputted over line 263 into the NAND gate 246 and through an inverter 264 to the NAND gate 248. The gate 248 is enabled to output a clock signal over line 266 to the clock input of the register 240 (FIG. 5C) which clocks the data bits BD0-BD7 inclusive appearing on the input lines 268 and transmitted from the data bus I/O unit 58 into the register. The lines 268 are part of the bus 45 (FIG. 1).

The function of the register 240 (FIG. 5C) is to provide the microprocessor unit 34 with control signals for controlling the operation of the interface unit 20 (FIG. 1). The register 240 will output over line 270 the board reset signal BDRST/ to the DMA controller unit 38 and also to the register 238 holding the interface unit 20 in a reset state until the address decode unit 40 receives the proper address bits from the microprocessor unit 34. When the signal BDRST/ goes high, the signal will enable the DMA controller unit for operation. The register 240 (FIG. 5C) will output the start/stop signal over line 176 to the FIFO storage unit 28 (FIG. 2A) controlling the operation of the storage unit and also to the register 238. This signal works in conjunction with the signal BDRST/ to enable the interface unit 20 when both signals are in a high state and to disable the interface unit with both signals are in a low state. The register 240 will also output a time-out signal TOS1 over line 272 to the time-out unit 52 (FIG. 1) for selecting a time-out period which is compatible to the operating frequency of the terminal device under test (UTT) 26. The register 240 will output a second time-out signal TOS2 over line 274 when the terminal device under test is operating at a faster rate. Both of these signals are transmitted to the status register 238. This status register will also receive over input line 113 the data strobe detect signal STRDET/, the FIFO full signal FF/ over line 160 and the FIFO half full signal XO/-HF/ over input line 164, all of which are transmitted from the FIFO storage unit 28 indicating the condition of the FIFO storage units 74 and 76 (FIG. 2B). The register 238 also receives over line 230 the counter overflow signal COV outputted from the timer unit 46 (FIG. 1).

If the microprocessor unit 34 is performing a read operation, the signal R/W/ appearing on line 262 will go high which causes the NAND gate 246 (FIG. 5B) to output a low signal over lines 276 and 278 to the register 238 enabling the register to extend the status signals stored therein. At the end of a microsecond unit 34 read or write cycle, the signal DMACS/ will go high followed by the signal IDTACK/ also going high. During an access operation by the microprocessor unit to the registers 238 and 240, the high output signal of the NAND gate 246 (FIG. 5B) appearing on the output line 244 as the inhibit signal ERI (FIG. 5C) is transmitted to the address data bus I/O unit 58 (FIG. 1) for inhibiting the output of data to the memory unit 64 from the storage registers located in the DMA controller unit 36 while these registers are being accessed by the microprocessor unit 34.

Figure 7:
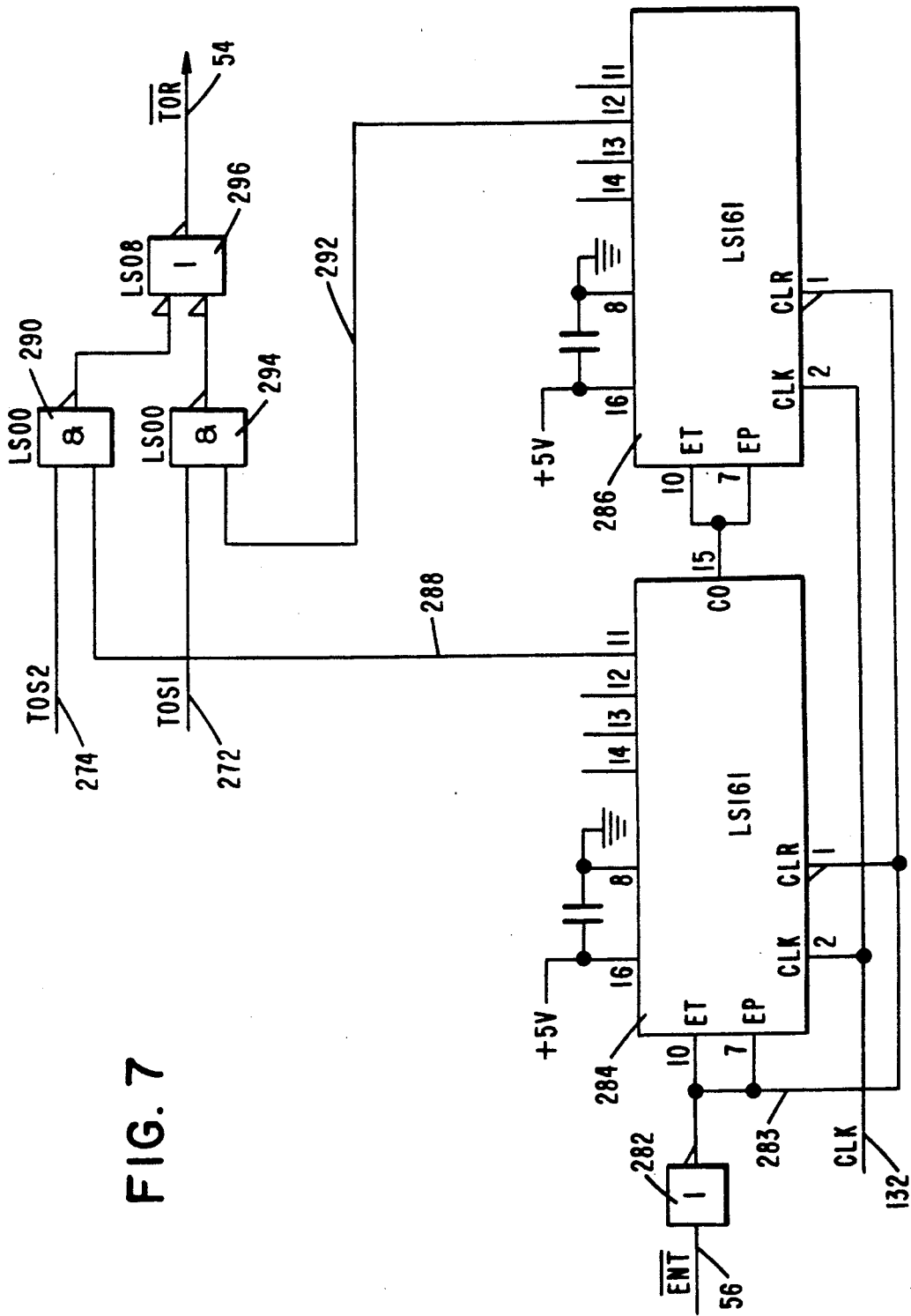
FIG. 7 is a block diagram of the time-out unit of the FIFO storage unit of FIG. 1.

Referring now to FIG. 7, there is disclosed a block diagram of the time-out unit 52 (FIG. 1) which is a portion of the FIFO storage unit 28. The time-out unit consists of a pair of LS161 counters 284 and 286 which serve as time-out counters to insure that the interface unit 20 will always synchronize its operation to the first word of every two consecutive data words inputted into the interface unit over the bus 27 from the bus interface unit 22 (FIG. 1). If the second word of the pair inputted is detected first, the counters 284 and 286 will generate the time-out signal TOR/ appearing on the output line 54 for transmission to the FIFO storage unit 28 (FIG. 2C) for resetting the flip-flops 88 (FIG. 2C) and 90 (FIG. 2D) which enables the FIFO storage unit to start over to obtain the proper sequence of the words to be stored. When either of the strobe pulses 32 or 33 (FIG. 8) is detected, the enable signal ENT/ appearing on input line 56 and outputted by the FIFO storage unit 28 (FIG. 2E) will be inverted by the inverter 282 and outputted over line 283 to enable the counters 284 and 286. The counters are clocked by eight megacycle clock signals CLK appearing on input line 132. The counter 284 is set to time-out in one microsecond while the counter 286 is set to time-out in four microseconds. The counters are cleared by the second signal ENT appearing on the input line 56 upon the detection of the next strobe pulse, which is transmitted on line 283 to the clear input of the counters. The counter 284 will output a time-out signal over output line 288 to one input of the NAND gate 290 which also receives the time-out control signal TOS2 appearing on the input line 274 and transmitted from the address decode unit 40 (FIG. 5C). As previously described, this signal is utilized when the data terminal device under test is operating at a very high rate of speed. The counter 286 will output a time-out signal over line 292 to one input of the NAND gate 294 which receives at its other input the time-out control signal TOS1 over input line 272. The outputs of the NAND gate 290 and 294 are inputted into a NOR gate 296 which will output the time-out signal TOR/ over output line 54 for transmission to the FIFO storage unit 28 (FIG. 2C) which resets the storage unit for a new operation.

In the operation of the interface unit 20, the bus interface unit 22 will output pairs of data words together with a pair of strobe pulses used in storing the data words in the FIFO storage unit 28 and to enable the timer unit 46 to generate the time stamp data representing the elapsed time between the occurrence of two consecutive data words. The time stamp data is stored in the FIFO storage unit 28 with the data words as a result of detection of the second strobe pulse by the storage unit 28. When the storage unit 28 is half full, it notifies the DMA controller which outputs address bits to the memory unit 64 together with the data words and time stamp data stored in the storage unit 28.

While the salient features of the invention have been illustrated and described, it should be readily apparent to those skilled in the art that many changes and modifications can be made in the invention prescribed without departing from the spirit and true scope of the invention. Accordingly, the present invention should be considered as encompassing all such changes and modifications of the invention that fall within the broad scope of the invention as defined by the appended claims.

What is claimed is:

1. In a data processing system including a processor unit outputting a plurality of consecutive first and second pairs of first and second data words, an apparatus or time-stamping said consecutive pairs of data words comprising:

interface means coupled to the processor unit for receiving and outputting said consecutive first and second pairs of first and second data words, said interface means outputting an associated first control signal upon receiving the first data word of each consecutive pair of first and second data words outputted by the processor unit and an associated second control signal upon receiving the second data word of each consecutive pair of first and second data words;

a first storage means coupled to said interface means for receiving said pairs of first and second data words and their associated first and second control signals, said first storage means including first and second storage units, said first storage unit for storing the pairs of first and second data words in response to receiving said first and second control signals, said first storage means further including first logic circuit means coupled to said interface means and to said second storage unit for outputting a third control signal in response to receiving said first and second control signals, said second storage unit receiving and storing the pairs of first and second data words from the first storage unit in response to receiving the third control signal, said first logic circuit means further outputting a fourth control signal in response to receiving the first and second control signals;

timing means coupled to said first storage means and to said first logic circuit means and responsive to receiving the fourth control signal for generating time-stamp data words representing time periods occurring between consecutive second data words of each pair of first and second data words outputted by said processor unit, said timing means including second logic circuit means coupled to said first logic circuit means for outputting a fifth control signal to said first storage means in response to receiving said fourth control signal for storing said time-stamp data words in said second storage unit with their associated pairs of first and second data words;

said second storage unit outputting a sixth control signal when said second storage unit has stored a predetermined amount of said pairs of first and second data words and said time-stamp data words;

second storage means; and control means coupled to said second storage means and to said second storage unit for transferring the pairs of first and second data words and said time-stamp data words from said second storage unit to said second storage means in response to receiving said sixth control signal.

2. The apparatus of claim 1 in which said first storage unit includes latching means coupled to said interface means and to said second storage unit for storing the first data word of each pair of data words outputted from said interface means in response to receiving said first control signal associated with said first data word, said first logic circuit means outputting said third control signal in response to receiving the second control signal associated with the second data word of said each pair of data words, said second storage unit for storing the first data word stored in said latching means in response to receiving said third control signal.

3. The apparatus of claim 2 further including third logic circuit means coupled to said interface means for outputting a seventh control signal in response to receiving said first and second control signals, and time-out means coupled to said second storage unit and to said third logic circuit means for performing a time-out operation in response to receiving said seventh control signal, said third logic circuit means outputting an eighth control signal to said time-out means in response to a subsequent one of said first and second control signals for disabling said time-out operation performed by said time-out means.

4. The apparatus of claim 3 in which said control means includes controller means, said second storage unit outputting said sixth control signal to said controller means when said second storage unit is half-full of data words, said controller means transferring the data words stored in said second storage unit to said second storage means in response to receiving said sixth control signal.

5. The apparatus of claim 4 further including a second processor unit for outputting address bits, and decoder means coupled to said second processor unit and to said controller means for decoding said address data bits and for outputting a ninth control signal in response to the decoding of said address data bits, said controller means transferring the data words stored in said second storage unit to the second storage means in response to receiving said ninth control signal.

* * * * *

UNITED STATES PATENT AND TRADEMARK OFFICE
CERTIFICATE OF CORRECTION

PATENT NO. : 5,091,870

DATED : Feb. 25, 1992

INVENTOR(S) : Datsko et al.

It is certified that error appears in the above-identified patent and that said Letters Patent is hereby corrected as shown below:

Column 12, line 16, after "address" insert --data--.

Signed and Sealed this

Twenty-fifth Day of May, 1993

Attest:

MICHAEL K. KIRK

*Attesting Officer*     *Acting Commissioner of Patents and Trademarks*